US009369910B2

(12) United States Patent
Rajagopalan et al.

(10) Patent No.: US 9,369,910 B2
(45) Date of Patent: *Jun. 14, 2016

(54) METHODS, SYSTEMS, AND COMPUTER READABLE MEDIA FOR DYNAMICALLY CONTROLLING CONGESTION IN A RADIO ACCESS NETWORK

(71) Applicant: Tekelec, Inc., Morrisville, NC (US)

(72) Inventors: Sundaram Rajagopalan, Waltham, MA (US); Apirux Bantukul, Cary, NC (US); Ajay Padmakar Deo, Carrollton, TX (US)

(73) Assignee: TEKELEC, INC., Morrisville, NC (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/942,323

(22) Filed: Jul. 15, 2013

(65) Prior Publication Data

US 2014/0022897 A1  Jan. 23, 2014

Related U.S. Application Data

(60) Provisional application No. 61/671,691, filed on Jul. 14, 2012.

(51) Int. Cl.
*H04W 28/02* (2009.01)
*H04L 12/14* (2006.01)
(Continued)

(52) U.S. Cl.
CPC ....... *H04W 28/0215* (2013.01); *H04L 12/1403* (2013.01); *H04L 12/1407* (2013.01); *H04L 12/14* (2013.01); *H04M 15/00* (2013.01); *H04M 15/66* (2013.01); *H04W 28/0231* (2013.01);
(Continued)

(58) Field of Classification Search
CPC ............. H04W 28/0289; H04W 4/24; H04W 28/0231; H04L 12/14; H04L 12/1407; H04L 12/1403; H04M 15/66; H04M 15/00
See application file for complete search history.

(56) References Cited

U.S. PATENT DOCUMENTS 6,144,636 A   11/2000 Aimoto et al.
6,661,780 B2  12/2003 Li
6,880,005 B1   4/2005 Bell et al.
(Continued)

FOREIGN PATENT DOCUMENTS

CN         1849787 A     10/2006
CN  ZL200980130515.0     6/2009
(Continued)

OTHER PUBLICATIONS

Notice of Allowance and Fee(s) Due for U.S. Appl. No. 13/251,784 (Feb. 12, 2014).
(Continued)

*Primary Examiner* — Bunjob Jaroenchonwanit
(74) *Attorney, Agent, or Firm* — Jenkins, Wilson, Taylor & Hunt, P.A.

(57) ABSTRACT

Methods, systems, and computer readable media for dynamically controlling congestion in a radio access network are disclosed. According to one aspect, a system for dynamically controlling congestion in a radio access network includes a policy and charging rules function (PCRF) for receiving, from a node for communicating with user equipment via a radio access network, admission requests, and, in response to receiving the admission requests, installing, on the node, subscriber-specific policies to control congestion in the radio access network.

11 Claims, 4 Drawing Sheets

(51) Int. Cl.
*H04M 15/00* (2006.01)
*H04W 28/24* (2009.01)

(52) U.S. Cl.
CPC ........... *H04W 28/0289* (2013.01); *H04W 28/24* (2013.01)

(56) References Cited

U.S. PATENT DOCUMENTS

| | | |
|---|---|---|
| 7,072,651 B2 | 7/2006 | Jiang et al. |
| 8,305,922 B2 | 11/2012 | Cuervo |
| 8,326,263 B2 | 12/2012 | Zhou et al. |
| 8,331,229 B1 | 12/2012 | Hu et al. |
| 8,335,220 B2 | 12/2012 | Hu et al. |
| 8,353,000 B2 | 1/2013 | He et al. |
| 8,400,916 B2 | 3/2013 | Cutler at al. |
| 8,406,137 B2 | 3/2013 | Siddam at al. |
| 8,433,794 B2 | 4/2013 | Baniel et al. |
| 8,438,290 B2 | 5/2013 | Rui at al. |
| 8,543,118 B1* | 9/2013 | Mangal et al. ............... 455/444 |
| 8,577,329 B2 | 11/2013 | Momtahan et al. |
| 8,595,368 B2 | 11/2013 | Baniel et al. |
| 8,601,073 B2 | 12/2013 | Craig at al. |
| 8,605,583 B2 | 12/2013 | Cutler et al. |
| 8,626,156 B2 | 1/2014 | Marsico |
| 8,630,925 B2 | 1/2014 | Bystrom et al. |
| 8,675,487 B2 | 3/2014 | Siddam at al, |
| 8,681,622 B2 | 3/2014 | Chatterjee at al. |
| 8,683,544 B2 | 3/2014 | Foottit et al. |
| 8,787,174 B2 | 7/2014 | Riley et al. |
| 8,812,020 B2 | 8/2014 | Marsico |
| 8,818,327 B2 | 8/2014 | Shalkh |
| 9,106,769 B2 | 8/2015 | Kanode et al. |
| 2003/0003928 A1 | 1/2003 | Marjelund et al. |
| 2004/0116117 A1 | 6/2004 | Ahvonen et al. |
| 2005/0064889 A1 | 3/2005 | Haumont |
| 2005/0107091 A1 | 5/2005 | Vannithamby et al. |
| 2005/0176438 A1 | 8/2005 | Li |
| 2005/0195743 A1 | 9/2005 | Rochberger et al. |
| 2006/0013191 A1 | 1/2006 | Kavanagh |
| 2007/0004393 A1 | 1/2007 | Forsberg et al. |
| 2007/0054665 A1 | 3/2007 | Elkarat et al. |
| 2007/0066286 A1 | 3/2007 | Hurtta |
| 2007/0121812 A1 | 5/2007 | Strange et al. |
| 2007/0153995 A1 | 7/2007 | Fang et al. |
| 2007/0159976 A1 | 7/2007 | Dekeyzer et al. |
| 2007/0165599 A1 | 7/2007 | Skog et al. |
| 2007/0195788 A1 | 8/2007 | Vasamsetti et al. |
| 2007/0232301 A1* | 10/2007 | Kueh ............................ 455/433 |
| 2008/0043689 A1 | 2/2008 | Walter |
| 2008/0046963 A1 | 2/2008 | Grayson et al. |
| 2008/0142599 A1 | 6/2008 | Benillouche et al. |
| 2008/0153484 A1 | 6/2008 | Boni et al. |
| 2008/0159194 A1 | 7/2008 | Westman et al. |
| 2008/0205345 A1 | 8/2008 | Sachs et al. |
| 2008/0232376 A1 | 9/2008 | Huang et al. |
| 2009/0061855 A1 | 3/2009 | Sethi et al. |
| 2009/0109845 A1* | 4/2009 | Andreasen et al. ........... 370/230 |
| 2009/0111458 A1 | 4/2009 | Fox et al. |
| 2009/0177650 A1 | 7/2009 | Petersson et al. |
| 2009/0185494 A1 | 7/2009 | Li et al. |
| 2009/0207730 A1 | 8/2009 | Stamoulis et al. |
| 2009/0219946 A1 | 9/2009 | Liu et al. |
| 2009/0225762 A1 | 9/2009 | Davidson et al. |
| 2009/0228956 A1 | 9/2009 | He et al. |
| 2009/0232019 A1 | 9/2009 | Gupta et al. |
| 2009/0270099 A1* | 10/2009 | Gallagher et al. ......... 455/435.1 |
| 2009/0325574 A1 | 12/2009 | Izawa et al. |
| 2010/0040047 A1 | 2/2010 | Castellanos Zamora et al. |
| 2010/0048161 A1 | 2/2010 | He et al. |
| 2010/0080171 A1 | 4/2010 | Rune et al. |
| 2010/0091671 A1* | 4/2010 | Lidstrom et al. ............... 370/252 |
| 2010/0121960 A1* | 5/2010 | Baniel et al. .................. 709/228 |
| 2010/0190497 A1 | 7/2010 | Pudney et al. |
| 2010/0192170 A1 | 7/2010 | Raleigh |
| 2010/0241496 A1 | 9/2010 | Gupta et al. |
| 2010/0246500 A1 | 9/2010 | Rydnell et al. |
| 2010/0284278 A1* | 11/2010 | Alanara ........................ 370/235 |
| 2010/0287121 A1 | 11/2010 | Li et al. |
| 2010/0291924 A1 | 11/2010 | Antrim et al. |
| 2010/0297985 A1 | 11/2010 | Van Erlach |
| 2010/0299451 A1 | 11/2010 | Yigang et al. |
| 2011/0035495 A1* | 2/2011 | Ekstrom et al. ................ 709/225 |
| 2011/0067085 A1* | 3/2011 | Brouard et al. .................... 726/1 |
| 2011/0076985 A1 | 3/2011 | Chami et al. |
| 2011/0103261 A1 | 5/2011 | Duan |
| 2011/0116382 A1 | 5/2011 | McCann et al. |
| 2011/0122886 A1* | 5/2011 | Willars et al. ................. 370/412 |
| 2011/0138066 A1* | 6/2011 | Kopplin et al. ............... 709/228 |
| 2011/0158090 A1 | 6/2011 | Riley et al. |
| 2011/0165901 A1 | 7/2011 | Baniel et al. |
| 2011/0171958 A1 | 7/2011 | Hua et al. |
| 2011/0188457 A1 | 8/2011 | Shu et al. |
| 2011/0199903 A1 | 8/2011 | Cuervo |
| 2011/0217979 A1 | 9/2011 | Nas |
| 2011/0225306 A1 | 9/2011 | Delsesto et al. |
| 2011/0299395 A1 | 12/2011 | Mariblanca Nieves |
| 2011/0307790 A1 | 12/2011 | Pandya et al. |
| 2011/0317557 A1 | 12/2011 | Siddam et al. |
| 2012/0014332 A1 | 1/2012 | Smith et al. |
| 2012/0028626 A1 | 2/2012 | Marocchi et al. |
| 2012/0039175 A1 | 2/2012 | Sridhar et al. |
| 2012/0044867 A1 | 2/2012 | Faccin et al. |
| 2012/0052866 A1 | 3/2012 | Froehlich et al. |
| 2012/0057463 A1 | 3/2012 | Hurtta et al. |
| 2012/0087368 A1 | 4/2012 | Kunarathnam et al. |
| 2012/0094685 A1 | 4/2012 | Marsico |
| 2012/0099438 A1 | 4/2012 | Wang et al. |
| 2012/0099529 A1 | 4/2012 | Williams |
| 2012/0099715 A1 | 4/2012 | Ravishankar et al. |
| 2012/0100849 A1 | 4/2012 | Marsico |
| 2012/0115478 A1 | 5/2012 | Gunaratnam et al. |
| 2012/0131165 A1* | 5/2012 | Baniel et al. .................. 709/223 |
| 2012/0140632 A1 | 6/2012 | Norp et al. |
| 2012/0142311 A1 | 6/2012 | Rui et al. |
| 2012/0155389 A1 | 6/2012 | McNamee et al. |
| 2012/0176894 A1 | 7/2012 | Cai et al. |
| 2012/0203781 A1 | 8/2012 | Wakefield |
| 2012/0213072 A1* | 8/2012 | Kotecha et al. ............... 370/235 |
| 2012/0215930 A1 | 8/2012 | Stenfelt et al. |
| 2012/0221445 A1 | 8/2012 | Sharma |
| 2012/0221693 A1 | 8/2012 | Cutler et al. |
| 2012/0250573 A1* | 10/2012 | Kulasingam et al. ......... 370/254 |
| 2012/0250613 A1* | 10/2012 | Robinson et al. ............. 370/328 |
| 2012/0257499 A1 | 10/2012 | Chatterjee et al. |
| 2012/0281617 A1 | 11/2012 | Bumiller |
| 2012/0290452 A1* | 11/2012 | Pancorbo Marcos et al. .. 705/30 |
| 2012/0303796 A1 | 11/2012 | Mo et al. |
| 2013/0039176 A1 | 2/2013 | Kanode et al. |
| 2013/0041994 A1 | 2/2013 | Terrien et al. |
| 2013/0070594 A1* | 3/2013 | Garcia Martin et al. ...... 370/235 |
| 2013/0079006 A1* | 3/2013 | Cho et al. ................... 455/435.1 |
| 2013/0114404 A1* | 5/2013 | Yang ............................. 370/228 |
| 2013/0160058 A1* | 6/2013 | Albal et al. ...................... 725/62 |
| 2013/0163429 A1 | 6/2013 | Dunstan et al. |
| 2013/0177146 A1* | 7/2013 | Schneider et al. ............. 379/188 |
| 2013/0265911 A1 | 10/2013 | Kulaingam et al. ........... 370/259 |
| 2013/0279401 A1 | 10/2013 | Sander et al. |
| 2014/0011512 A1* | 1/2014 | Hu et al. ..................... 455/452.2 |
| 2014/0018067 A1* | 1/2014 | Rajagopalan et al. ...... 455/432.1 |
| 2014/0031029 A1 | 1/2014 | Rajagopalan et al. |
| 2014/0040975 A1* | 2/2014 | Raleigh et al. ..................... 726/1 |
| 2015/0011182 A1* | 1/2015 | Goldner et al. ................ 455/406 |

FOREIGN PATENT DOCUMENTS

| | | |
|---|---|---|
| EP | 1 501 242 A2 | 1/2005 |
| EP | 1 551 144 A1 | 7/2005 |
| EP | 0 857 399 B1 | 5/2007 |
| EP | 1 988 680 A1 | 11/2008 |
| EP | 2 093 931 A1 | 8/2009 |
| EP | 2 289 283 B1 | 2/2014 |
| EP | 2 520 045 B1 | 7/2015 |
| WO | WO 2007/092573 A2 | 8/2007 |

(56) References Cited

FOREIGN PATENT DOCUMENTS

| WO | WO 2008/000287 A1 | 1/2008 |
|---|---|---|
| WO | WO 2009/058067 A1 | 5/2009 |
| WO | WO 2009/149341 A2 | 12/2009 |
| WO | WO 2011/082035 A2 | 7/2011 |
| WO | WO 2014/014823 A1 | 1/2014 |
| WO | WO 2014/015331 A1 | 1/2014 |

OTHER PUBLICATIONS

Final Office Action for U.S. Appl. No. 13/040,020 (Dec. 13, 2013).
Notification of Transmittal of the International Search Report and the Written Opinion of the International Searching Authority, or the Declaration for International Application No. PCT/US2013/050512 (Dec. 2, 2013).
Notice of Allowance and Fee(s) Due for U.S. Appl. No. 13/330,086 (Nov. 6, 2013).
Notification of Transmittal of the International Search Report and the Written Opinion of the International Searching Authority, or the Declaration for International Application No. PCT/US2013/051447 (Oct. 28, 2013).
Non-Final Office Action for U.S. Appl. No. 12/973,228 (Oct. 25, 2013).
Non-Final Office Action for U.S. Appl. No. 13/251,784 (Oct. 10, 2013).
Advisory Action for U.S. Appl. No. 13/251,784 (Sep. 6, 2013).
Notice of Allowance and Fee(s) Due for U.S. Appl. No. 13/276,916 (Sep. 3, 2013).
Non-Final Office Action for U.S. Appl. No. 13/040,020 (Jul. 18, 2013).
Final Office Action for U.S. Appl. No. 13/251,784 (June. 26, 2013).
Final Office Action for U.S. Appl. No. 12/973,228 (Jun. 21, 2013).
"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).
Non-Final Office Action for U.S. Appl. No. 13/276,916 (Apr. 11, 2013).
Non-Final Office Action for U.S. Appl. No. 12/973,228 (Feb. 1, 2013).
Non-Final Office Action for U.S. Appl. No. 13/251,784 (Dec. 19, 2012).
Communication of European Publication Number and Information on the Application of Article 67(3) EPC for European Patent Application No. 10841576.1 (Oct. 10, 2012).
"Digital cellular telecommunications system (Phase 2+); Universal Mobile Telecommunications System (UMTS); LTE; Policy and charging control architecture (3GPP TS 23.203 version 8.14.0 Release 8)," ETSI TS 123 203, pp. 1-118 (Jul. 2012).
Notification of Transmittal of the International Search Report and the Written Opinion of the International Searching Authority, or the Declaration for International Patent Application No. PCT/US2010/061586 (Sep. 26, 2011).
3GPP, "3rd Generation Partnership Project; Technical Specification Group Services and System Aspects; Universal Geographical Area Description (GAD) (Release 10),"3GPP TS 23.032 V10.0.0, pp. 1-29 (Mar. 2011).
"Smart Cards; Card Application Toolkit (CAT) (Release 9)," ETSI TS 102 223 V9.2.0, pp. 1-209 (Oct. 2010).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).
3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0 pp. 1-162 (Jun. 2010).
3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).
Znaty, "Diameter, GPRS, (LTE + ePC = EPS), IMS, PCC and SDM," Effort, pp. 1-229 (Part 1 of 2) (May 2010).
Znaty, "Diameter, GPRS, (LTE + ePC = EPS), IMS, PCC and SDM,"Efort pp. 230-461 (Part 2 of 2) (May 2010).
Universal Mobile Telecommunications System (UMTS); LTE; Policy and Charging Control over Gx Reference Point (3GPP TS 29.212 version 9.2.0 Release 9), ETSI TS 129 212 V9.2.0, pp. 1-115 (Apr. 2010).
3GPP, "3rd Generation Partnership Project; Technical Specification Group Core Network and Terminals; Policy and Charging Control over Gx Reference Point (Release 9),"3GPP TS 29.212 V9.2.0, pp. 1-111 (Mar. 2010).
3GPP, "3rd Generation Partnership Project; Technical Specification Group Services and System Aspects; Network identity and Timezone (NITZ) Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
International Standard, "Maritime Navigation and Radiocomunication Equipment and Systems—Digital Interfaces—Part 1: Single Talker and Multiple Listeners," IEC 61162-1, Second edition, pp. 1-86 (Jul. 2000).
Non-Final Office Action for U.S. Appl. No. 13/942,205 (Sep. 14, 2015).
Letter Regarding Decision to Grant for Chinese Patent Application No. 201080064945.X (Sep. 1, 2015).
Advisory Action Before the Filing of an Appeal Brief and AFCP 2.0 Decision for U.S. Appl. No. 13/942,205 (Jul. 31, 2015).
Final Office Action & Applicant-Initiated Interview Summary for U.S. Appl. No. 13/947,314 (Jul. 16, 2015).
Notice of Allowance and Fee(s) Due & Examiner-Initiated Summary for U.S. Appl. No. 13/040,020 (Jul. 8, 2015).
Advisory Action Before the Filing of Appeal Brief and AFCP 2.0 Decision for U.S. Appl. No. 13/572,132 (Jun. 4, 2015).
Final Office Action for U.S. Appl. No. 13/942,205 (May 19, 2015).
Communication under Rule 71(3) EPC for European Patent Application No. 10841576.1 (May 7, 2015).
Application-Initiated Interview Summary for U.S. Appl. No. 13/572,132 (Apr. 29, 2015).
Applicant-Initiated Interview Summary for U.S. Appl. No. 13/040,020 (Apr. 28, 2015).
Communication of European Publication Number and Information on the Application of Article 67(3) EPC for European Patent Application No. 13820508.3 (Apr. 22, 2015).
Communication of European Publication Number and Information on the Application of Article 67(3) EPC for European Application No. 13819665.4 (Apr. 22, 2015).
Notification of the Second Office Action for Chinese Patent Application No. 201080064945.X (Apr. 22, 2015).
Notice of Allowance and Fee(s) Due and Interview Summary for U.S. Appl. No. 13/572,156 (Apr. 6, 2015).
Final Office Action for U.S. Appl. No. 13/572,132 (Mar. 11, 2015).

(56) References Cited

OTHER PUBLICATIONS

Applicant-Initiated Interview Summary for U.S. Appl. No. 13/942,205 (Jan. 30, 2015).
Non-Final Office Action for U.S. Appl. No. 13/040,020 (Jan. 29, 2015).
Non-Final Office Action for U.S. Appl. No. 13/947,314 (Jan. 16, 2015).
Final Office Action for U.S. Appl. No. 13/572,156 (Dec. 29, 2014).
Advisory Action and Examiner-Initiated Interview Summary for U.S. Appl. No. 13/040,020 (Dec. 5, 2014).
Non-Final Office Action for U.S. Appl. No. 13/942,205 (Nov. 6, 2014).
Final Office Action for U.S. Appl. No. 13/040,020 (Sep. 19, 2014).
First Office Action for Chinese Application No. 201080064945.X (Sep. 17, 2014).
Non-Final Office Action for U.S. Appl. No. 13/572,132 (Aug. 11, 2014).
Non-Final Office Action for U.S. Appl. No. 13/572,156 (May 23, 2014).
European Search Report for European Patent Application No. 10841576.1 (May 9, 2014).
Non-Final Office Action for U.S. Appl. No. 13/040,020 (Apr. 21, 2014).
Applicant-Initiated Interview Summary for U.S. Appl. No. 13/040,020 (Mar. 20, 2014).
Notice of Allowance and Fee(s) Due for U.S. Appl. No. 12/973,228 (Mar. 20, 2014).
Notification of Transmittal of the International Search Report and the Written Opinion of the International Searching Authority, or the Declaration for International Application No. PCT/US2013/050497 (Oct. 29, 2013).
Ye et al., "Enabling Local Breakout from eNB in LTE Networks," 2012 IEEE International Conference on Communications (ICC), pp. 6982-6986 (Jun. 10-15, 2012).
"3rd Generation Partnership Project; Technical Specification Group Services and System Aspects; Local IP Access and Selected IP Traffic Offload (LIPA-SIPTO) (Release 10)," 3GPP TR 23.829, pp. 1-43 (Oct. 2011).
Balbás et al., "Policy and Charging Control in the Evolved Packet System," LTE—3GPP Release 8, IEEE Communications Magazine, pp. 68-74 (Feb. 2009).
Calhoun et al., "Diameter Base Protocol," RFC 3588, pp. 1-147 (Sep. 2003).
Office Action for Canadian Application No. 2,730,103 (Apr. 16, 2015).
Letter Regarding Decision to grant a Chinese patent for Chinese Application No. ZL200980130515.0 (Dec. 2, 2014).
Notification of the Third Office Action for Chinese Application No. 200980130515.0 (Jun. 26, 2014).
Decision to grant a European patent pursuant to Article 97(1) EPC for European Application No. 09759499.8 (Jan. 23, 2014).
Seocnd Office Action for Chinese Application No. 200980130515.0 (Dec. 10, 2013).
Communication Under Rule 71(3) EPC for European Patent Application No. 09759499.8 (Aug. 14, 2013).
Notice of Allowance and Fee(s) Due for U.S. Appl. No. 12/479,179 (Jul. 9, 2013).
Interview Summary for U.S. Appl. No. 12/479,179 (Jul. 1, 2013).
First Office Action for Chinese Patent Application No. 200980130515.0 (Apr. 24, 2013).
Final Office Action for U.S. Appl. No. 12/479,179 (Feb. 15, 2013).
Notice of Allowance and Fee(s) Due for U.S. Appl. No. 13/225,390 (Oct. 9, 2012).
Non-Final Official Action for U.S. Appl. No. 12/479,179 (Sep. 13, 2012).
European Search Report for European Patent Application No. EP 09 75 9499 (Sep. 12, 2012).
Applicant-Initiated Interview Summary for U.S. Appl. No. 13/225,390 (Aug. 13, 2012).
Non-Final Official Action for U.S. Appl. No. 13/225,390 (May 14, 2012).
Final Official Action for U.S. Appl. No. 12/479,179 (Apr. 10, 2012).
Non-Final Official Action for U.S. Appl. No. 12/479,179 (Aug. 2, 2011).
Restriction Requirement for U.S. Appl. No. 12/479,179 (Feb. 8, 2011).
Communication of European publication number and information on the application of Article 67(3) EPC for European Application No. 09759499.8 (Feb. 2, 2011).
Notification of Transmittal of the International Search Report and the Written Opinion of the International Searching Authority, or the Declaration for International Application No. PCT/US2009/046395 (Dec. 28, 2009).
"Chapter 1: Overview of GPRS and UMTS," Cisco GGSN release 9.0 Configuration Guide, Cisco IOS Release 12.4(22)YE, pp. 1-1-1-16 (Aug. 4, 2009).
"Introduction to Diameter," Wikipedia, pp. 1-12 (Downloaded from the Internet on May 15, 2009).
"Diameter Credit-Control Application," Wikipedia, pp. 1-7 (Downloaded from the Internet on May 13, 2009).
"Diameter (Protocol)," Wikipedia, pp. 1-8 (Downloaded from the Internet on May 13, 2009).
"File: GPRS Core Structure.phg," Wikipedia, pp. 1-3 (Downloaded from the Internet on May 13, 2009).
"GPRS Core Network," Wikipedia, pp. 1-6 (Downloaded from the Internet on May 13, 2009).
"GPRS Network Architecture," DenMasBroto, pp. 1-2 (May 28, 2008).
Agilent Technologies, "Understanding DSLAM and BRAS Access Devices," White Paper, pp. 1-15 (2006).
"GPRS Tutorial," MorganDoyle Limited, pp. 1-13 (Publication Date Unknown).

\* cited by examiner

METHODS, SYSTEMS, AND COMPUTER READABLE MEDIA FOR DYNAMICALLY CONTROLLING CONGESTION IN A RADIO ACCESS NETWORK

PRIORITY CLAIM

This application claims the benefit of U.S. Provisional Patent Application Ser. No. 61/671,691, filed Jul. 14, 2012; the disclosure of which is incorporated herein by reference in its entirety.

TECHNICAL FIELD

The subject matter described herein relates to methods and systems for controlling congestion in telecommunications networks. More particularly, the subject matter described herein relates to methods, systems, and computer readable media for dynamically controlling congestion in a radio access network.

BACKGROUND

Wireless operators are struggling to cope with the data deluge in their networks, and make sure that the wireless spectrum is prioritized to suit their business objectives. The mobile network operator is being pressured both from the increased amount of access (e.g., the rate of growth of smartphone adoption) and the increased amount of data flow (e.g., the rate of growth in data use in the network) in the mobile network. Previous methods of offsetting increases in capital expenditures and operating expenditures by using operator-owned services are not as effective as they used to be in a voice-service dominated world.

In addition to this, there is a new class of devices, called Machine to Machine devices (M2M). This class of devices has mobility profiles very different from the mobility profiles that the operator was used to in the cellular (human) networks of yesterday. As a result, many operators have to try to reduce the cost-per-bit for the network and simplify the mobile network infrastructure further than it has evolved into in 3GPP Release 8. 3GPP Release 8 has already flattened the network hierarchy, removed many 3GPP specific protocols, and made the network more akin to IP networks, but this can be improved further.

To this end, the wireless operator currently has no mechanism for performing admission-control-like activities based on information provided by core network elements and higher layers, such as subscriber/device information, application and service information, quota usage, the access point name (APN)/data packet network (PDN) being accessed, etc., at the software entity performing the Radio Resources Control (RRC). Being able to do so would allow the operator to gate the use of radio resources in the radio access network (RAN) in a manner that prefers one request for admission to use dedicated radio resources over the other, and would satisfy an emerging requirement that the operator needs for providing differentiated services in the network.

Accordingly, there exists a need for methods, systems, and computer readable media for dynamically controlling congestion in a radio access network.

SUMMARY

According to one aspect, the subject matter described herein includes a system for dynamically controlling congestion in a radio access network. The system includes a policy and charging rules function (PCRF) for receiving, from a node for communicating with user equipment via a radio access network, admission requests, and, in response to receiving the admission requests, installing, on the node, subscriber-specific policies to control congestion in the radio access network.

According to another aspect, the subject matter described herein includes a method for dynamically controlling congestion in a radio access network. The method includes, at a policy and charging rules function (PCRF), receiving admission requests from a node for communicating with user equipment via a radio access network, and, in response to receiving the admission requests, installing, on the node, subscriber-specific policies to control congestion in the radio access network.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
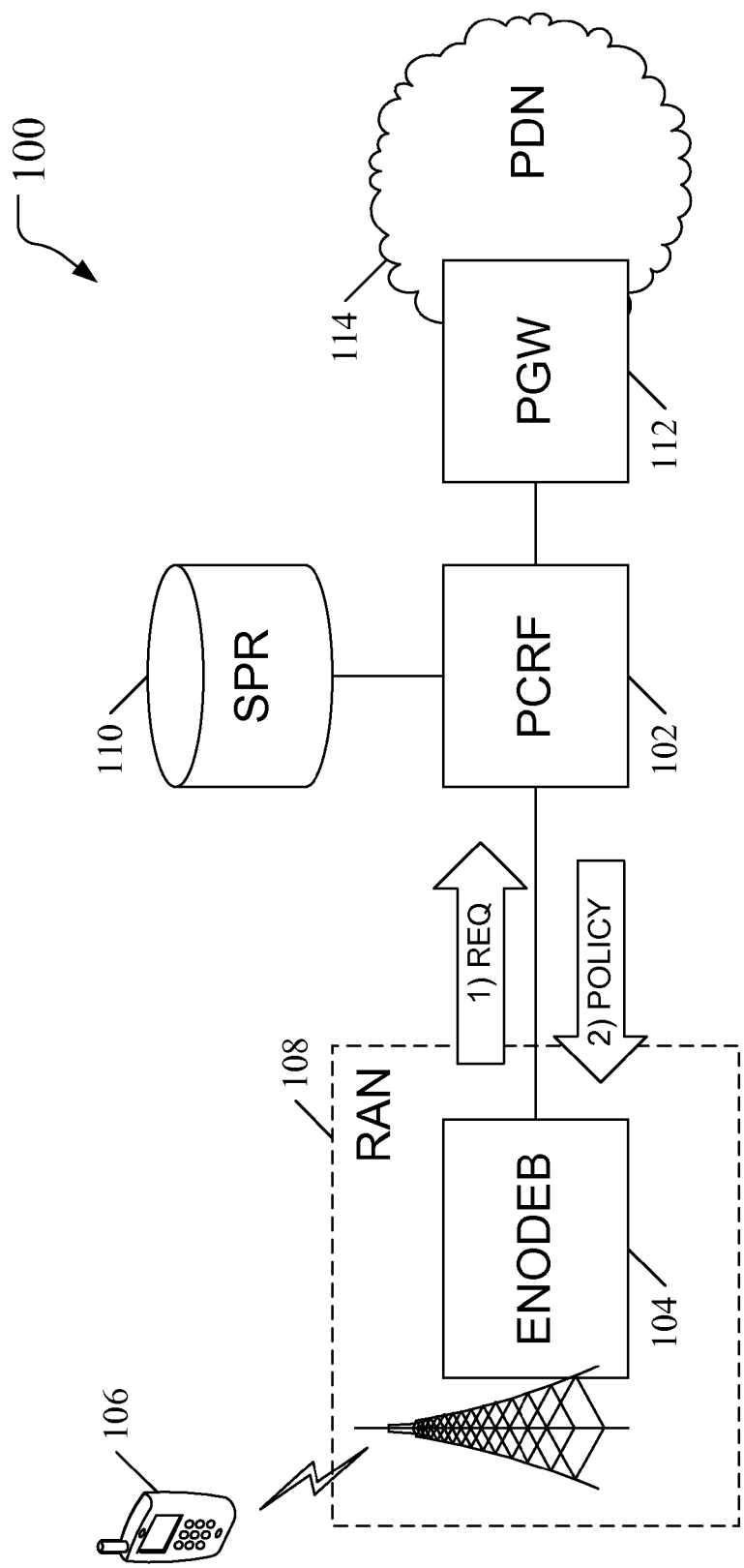
FIG. 1 is a block diagram illustrating an exemplary system for dynamically controlling congestion in a radio access network according to an embodiment of the subject matter described herein.

In accordance with the subject matter disclosed herein, systems, methods, and computer readable media are provided for controlling congestion in a radio access network. Reference will now be made in detail to exemplary embodiments of the present invention, examples of which are illustrated in the accompanying drawings. Wherever possible, the same reference numbers will be used throughout the drawings to refer to the same or like parts.

Radio access networks are positioned between the mobile device and the core network. The core network includes a policy control infrastructure, which in conventional networks does not interact with the RAN directly. The Policy control infrastructure has access to subscriber and device information via its communication with the subscriber provisioning systems such as a subscriber profile repository (SPR) or home subscriber server (HSS), and also may have application and service sensitivity using the interaction with any deep packet inspection (DPI) devices in the core network. In addition, the Policy infrastructure may also have access to information about network conditions, RAN load, etc. The subject matter described herein extends the reach of the policy control infrastructure into the RAN.

The methods and systems described in the subject matter disclosed herein tie the admission control functions already existing in the RAN infrastructure in the operator network (e.g., in the eNodeB) with the intelligence in the Policy infrastructure, to perform admission control functions in the RAN in a dynamic fashion. For example, using subscriber tier information, the operator can allow or disallow the access of the radio resources by subscribers whose tier is lower than a threshold which is set by the operator. RAN vendors have balked at controlling congestion in the radio waves because controlling network congestion reduces the need for their product.

Bringing the level of awareness and intelligence into the RAN as described herein is unprecedented but useful—operators of conventional networks are unable to gate the admission of call processing based on the subscriber's tier and/or device. This level of control, however, is possible with the methods and systems described herein. Moreover, this action can be completely dynamic, with the Policy infrastructure sending a policy command to the RAN infrastructure to start throttling when the Policy infrastructure notices that the RAN gear is overloaded, and then remove the policy when the Policy infrastructure notices that the network has resumed normal or reduced load levels. This level of service differentiation at the access side is unprecedented but warranted because the operator pays many billions of dollars every year in spectrum charges, but unfortunately spends a lot of money in managing signaling congestion owing to subscribers of all tiers, which has the negative effect of diluting the operator ROI.

The benefits described above may be further enhanced when the RAN gear operates as a policy enforcement point controlled by the core network, which makes possible a rich suite of QoS, access control, application and service awareness at the access layer.

FIG. 1 is a block diagram illustrating an exemplary system for dynamically controlling congestion in a radio access network according to an embodiment of the subject matter described herein.

In one embodiment, a system 100 for controlling congestion in a radio access network includes a policy and charging rules function (PCRF) 102 that receives, from a node for communicating with user equipment via a radio access network, admission requests, and in response to receiving the admission requests, installs on the node subscriber-specific policies to control congestion in the radio access network.

In the embodiment illustrated in FIG. 1, for example, PCRF 102 may receive admission requests (message 1) from an evolved node B (eNodeB) 104 for communicating with user equipment, such as UE 106, via a radio access network (RAN) 108. In response to receiving the admission requests, PCRF 102 may install on eNodeB 104 subscriber-specific policies (message 2) to control congestion in RAN 108. In alternative embodiments, PCRF 102 may receive admission requests from, and install subscriber-specific policies to, other nodes that communicate with user equipment via RAN 108.

PCRF 102 may communicate with other nodes as part of the process of controlling congestion in the radio access network. In the embodiment illustrated in FIG. 1, for example, PCRF 102 may query a subscriber profile register (SPR) 110 that holds subscriber profile information to get information about a particular subscriber. System 100 may include a packet data network gateway (PGW) 112, which is the interface towards a packet data network (PDN) 114. PCRF 102 may provide subscriber specific policies or policy instructions to PGW 112 as well. An example operation of this system is shown in FIG. 2.

Figure 2:
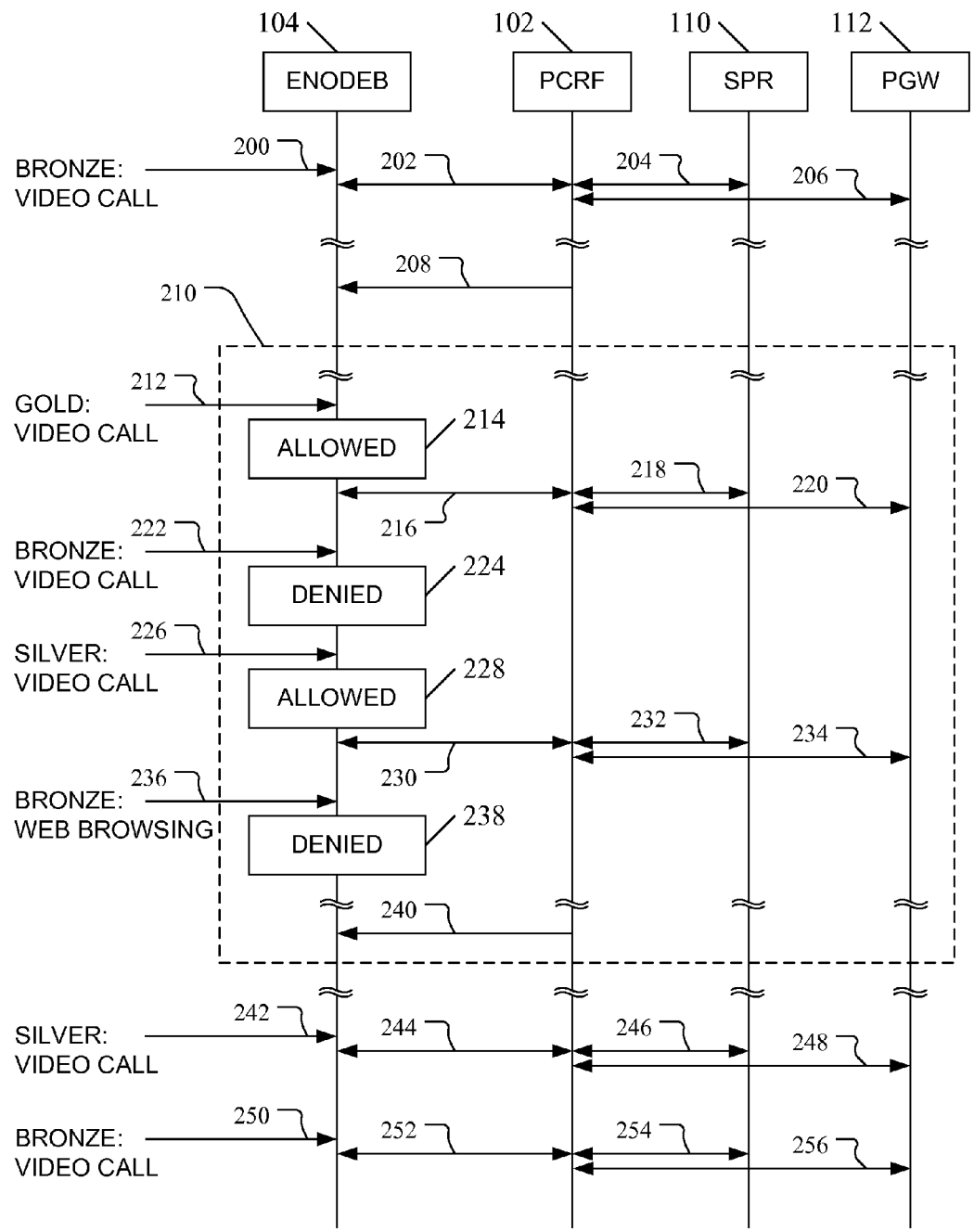
FIG. 2 is a signaling message flow diagram illustrating exemplary signaling messages communicated according to an embodiment of the subject matter described herein.

FIG. 2 is a signaling message flow diagram illustrating exemplary messages communicated according to an embodiment of the subject matter described herein. FIG. 2 illustrates wireless congestion control within a telecommunications network, and will be described with reference to the system illustrated in FIG. 1.

During operation, eNodeB 102 receives requests from wireless subscribers of all types, who are requesting access to network services via RAN 106. In the embodiment illustrated in FIG. 2, eNodeB 102 receives such a request 200, e.g., a signaling message from user equipment of a bronze subscriber who wants to initiate a video call. In response to receiving request 200, eNodeB 102 and PCRF 108 communicate with each other (signals 202) to determine the policy to apply for that subscriber. During this process, PCRF 108 may query SPR 110 for subscriber information, which SPR 110 provides to PCRF 108 (signals 204.) PCRF 108 may communicate subscriber-specific policy instructions to PGW 112 as well (signals 206.) The signaling messages 200, 202, 204, and 206 are representative of signaling messages exchanged between eNodeB 102, PCRF 108, SPR 110, and PGW 112, and illustrate the point that subscribers and devices of all types are allowed to set up a video call. That is, eNodeB 102 responds to every request by initiating signaling traffic to PCRF 108.

At some point, however, PCRF 108 may send an admission control policy instruction (message 208) to eNodeB 102 for the purpose of controlling wireless congestion. In the scenario illustrated in FIG. 2, for example, message 208 may instruct eNodeB 102 to allow video calls to be made only by subscribers of certain tiers and/or using certain equipment. Box 210 indicates the time of operation during which wireless congestion control is in effect.

In the embodiment illustrated in FIG. 2, several admission requests are received by eNodeB 102. The first is message 212, sent by a Gold Tier subscriber attempting to place a video call. Since Gold Tier customers are allowed to place video calls, this admission request is allowed (box 214) and eNodeB 102, PCRF 108, SPR 110, and PGW 112 engage in their usual interactions (signals 216, 218, and 220.)

The next admission request, message 222, is from a Bronze Tier subscriber attempting to make a video call. Since the congestion control policy currently in effect at eNodeB 112 prohibits this, the request is denied (box 224). As a result, the usual interaction between eNodeB 102, PCRF 108, SPR 110, and PGW 112 is avoided, which reduces wireless congestion.

A third admission request, message 226, is from a Silver Tier subscriber also attempting to make a video call. In this example, this is also allowed by the current congestion policy (box 228), and eNodeB 102, PCRF 108, SPR 110, and PGW 112 interact with each other (signals 230, 232, and 234.) In one embodiment, the Silver Tier subscriber may be allowed to make a video call, but with limits on bandwidth, video resolution, quality, etc.

A fourth admission request, message 236, is from a Bronze Tier subscriber wanting to connect to the network with a web browser. In the example illustrated in FIG. 2, this request is also denied (box 238), illustrating the principle that lower-tier subscribers may be severely limited by the congestion control polices provided by PCRF 108 and put into effect at eNodeB 102.

At some point, PCRF 108 issues yet another change of policy (message 240), such as to allow all calls, e.g., to revoke the congestion control measures previously in effect. This is indicated by the termination of box 210. Subsequent admission requests are processed without restriction. For example, a Silver Tier subscriber successfully places a video call (messages 242, 244, 246, and 248), and a Bronze Tier subscriber can now do the same (messages 250, 252, 254, and 256.)

Figure 3:
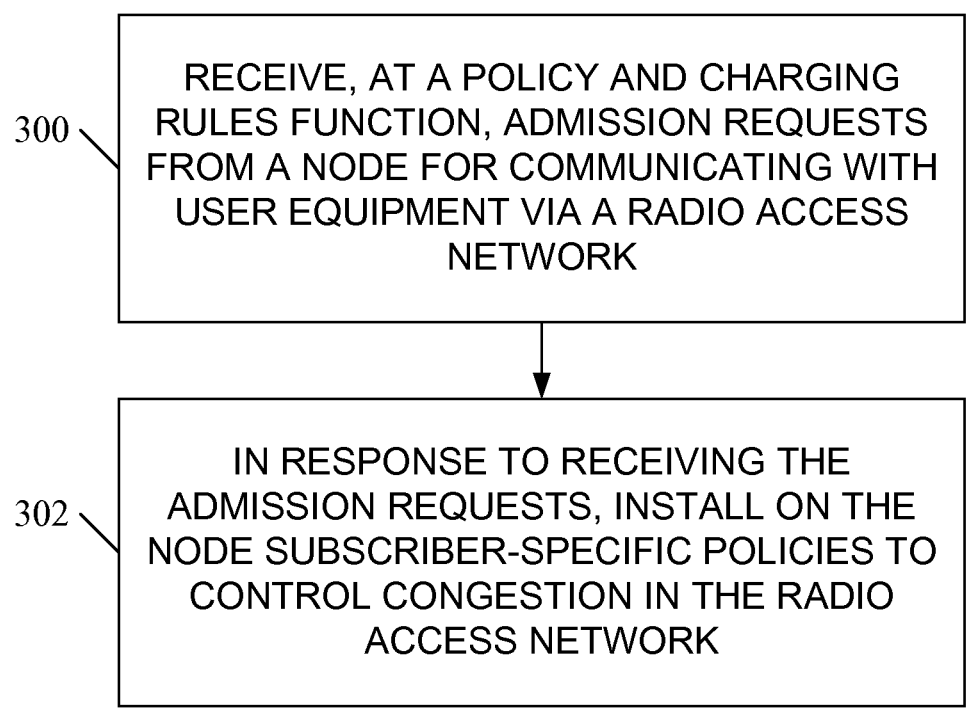
FIG. 3 is a flow chart illustrating an exemplary process for dynamically controlling congestion in a radio access network according to an embodiment of the subject matter described herein.

Thus, FIG. 3 illustrates the ability to dynamically control signaling costs in a mobile network. For example, PCRF 102 may apply a congestion control policy to eNodeB 104 in response to some trigger condition, such as a detected increase in admission requests. For example, PCRF 102 may apply congestion control in response to detecting that admission requests exceed a threshold rate or change of rate, in response to detecting relative percentages of requests by subscribers of different tiers, and so on. Likewise, these thresholds used to trigger application of a control policy by PCRF 102 may dynamically change or be statically set based on time of day, day of week, or other conditions. This flexibility allows PCRF 102 to dynamically apply congestion control to during peak usage hours, for example. Other examples include applying congestion control in response to detecting or being notified of other conditions, such as local or national emergencies or special events, etc.

By installing the policy to a node in the radio access network, signaling congestion due to lower tier subscribers can be reduced because the wireless access throttles and denies access right at the call processing stage for lower tier subscribers, thus preserving valuable wireless resources for higher tier subscribers. However, it should be noted that the same mechanism may be used to provide static congestion control, e.g., by installing policies on eNodeB 104 that instruct it to apply bronze tier throttling policies between 05:00 PM and 10:00 PM every day, regardless of traffic conditions.

FIG. 3 is a flow chart illustrating an exemplary process for dynamically controlling signaling costs in a mobile network according to an embodiment of the subject matter described herein. This process will now be described with reference to FIGS. 1 and 3.

At step 300, a policy and charging rules function receives admission requests from a node for communicating with user equipment via a radio access network. For example, PCRF 102 may receive an admission request from UE 106 via eNodeB 104 in RAN 108.

At step 302, in response to receiving the admission requests, subscriber-specific policies to control congestion in the radio access network are installed on the node. For example, PCRF 102 may install subscriber-specific policies onto eNodeB 102 to control congestion in RAN 108. The policies to control congestion in RAN 108 are then implemented by eNodeB 102.

Using PCRF 102 to provide wireless congestion control via policies subscriber specific policies provided to a node in the radio access network such as eNodeB 104 allows that RAN node to operate as a policy and charging enforcement function (PCEF) and gives network operators high levels of control over the signaling and data traffic that enters the core network via the radio access network. Examples of wireless congestion control that can be implemented in this manner include, but are not limited to, imposing access limits, signaling limits, or data limits based on subscriber tier, time of day, device time, or other conditions.

Figure 4:
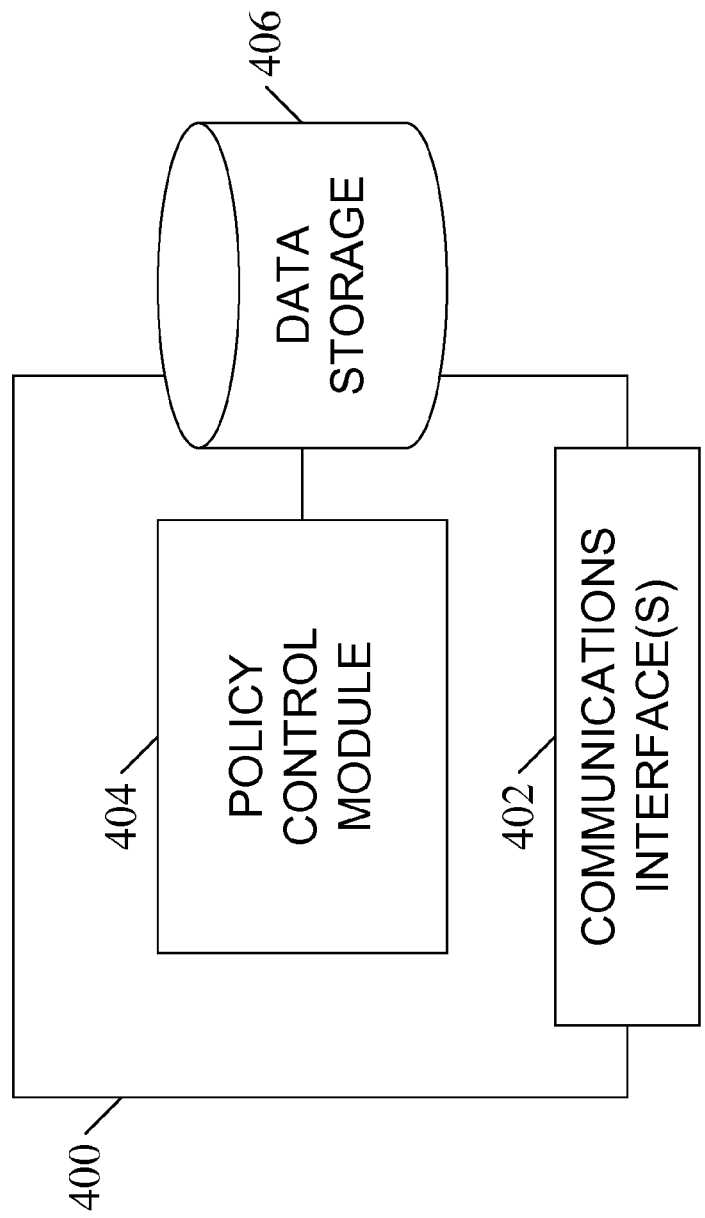
FIG. 4 is a block diagram illustrating an exemplary node for implementing congestion control in a radio access network according to an embodiment of the subject matter described herein.

FIG. 4 is a block diagram illustrating an exemplary node for implementing congestion control in a radio access network according to an embodiment of the subject matter described herein. In the embodiment illustrated in FIG. 4, node 400 includes one or more communications interfaces 402 for sending and receiving messages (e.g., via a Gx interface, Gxx interface, S1 interface, S7 interface, Sp interface, an extensible markup language (XML) interface, a session initiation protocol (SIP) interface, a SOAP interface, or a hypertext transfer protocol (HTTP) interface or others).

Node 400 may include a policy control module 404, which may be communicatively coupled with a data storage entity 406. Policy control module 404 may be any suitable entity (e.g., software executing on a processor) for performing one or more aspects of the subject matter described herein, such as implementing congestion control in a radio access network. Node 400 may access (read from and/or write information to) data storage entity 406. Data storage entity 406 may be any suitable entity (e.g., a computer readable medium or memory) for storing various data.

In one embodiment, node 400 may be a policy and charging rules function, or PCRF. Node 400 may receive admission requests via communications interface(s) 402 from a node for performing admission control functions in a radio access network. These admission requests may be processed by policy control module 404. In response to receiving the admission requests, policy control module 404 may retrieve subscriber-specific policies to control congestion in the radio access network from data storage entity 406 as needed, and install the appropriate policies onto the node for performing admission control functions in the radio access network. Node 400 may determine the appropriate policies to install based on information such as, but not limited to, network conditions, subscriber tiers, device types, location, time of day, QoS requirements, QoE requirements, service agreements, and/or other information.

It will be appreciated that the above description is for illustrative purposes and that node 400 may include additional and/or different modules or components.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for controlling congestion in a radio access network, the system comprising:
   one or more computers configured to execute a policy and charging rules function (PCRF) and, in executing the PCRF, perform operations comprising:
   receiving admission requests for accessing a radio access network from a node configured to perform admission control functions in the radio access network, wherein the node comprises an evolved node B (eNodeB) configured to communicate with user equipment via the radio access network; and
   in response to receiving the admission requests for accessing the radio access network and in response to determining to apply congestion control based on the admission requests, installing, by the PCRF, subscriber-specific policies on the eNodeB to control congestion in the radio access network, including sending, to the eNodeB, an admission control policy instruction to allow admission requests for accessing the radio access network made only by subscribers of certain tiers and subscriber information from a subscriber profile repository (SPR) for carrying out the admission control policy instruction, causing the eNodeB to:

receive a first admission request for accessing the radio access network and, in response to determining, using the subscriber information from the SPR, that a first subscriber tier for the first admission request is not one of the certain tiers of the admission control policy instruction, deny the first admission request for accessing the radio access network; and receive a second admission request for accessing the radio access network and, in response to determining, using the subscriber information from the SPR, that a second subscriber tier for the second admission request is one of the certain tiers of the admission control policy instruction, allow the second admission request for accessing the radio access network.

2. The system of claim 1 wherein the PCRF is configured, by executable instructions for the one or more computers stored on a non-transitory computer readable medium, to install on the node congestion control policies to manage congestion in the radio access network based on time of day.

3. The system of claim 1 wherein the PCRF is configured by executable instructions for the one or more computers stored on a non-transitory computer readable medium, to install on the node congestion control policies to manage congestion in the radio access network based on device type.

4. The system of claim 1 wherein the PCRF is configured, by executable instructions for the one or more computers stored on a non-transitory computer readable medium, to install congestion control policies in the radio access network based on network conditions, including congestion.

5. The system of claim 1 wherein the PCRF is configured, by executable instructions for the one or more computers stored on a non-transitory computer readable medium, to install congestion control policies to manage congestion in the radio access network based on quality of service (QoS) requested by an application on a user equipment (UE).

6. A method for controlling congestion in a radio access network the method comprising:

at one or more computers executing a policy and charging rules function (PCRF):

receiving admission requests for accessing the radio access network from a node configured to perform admission control functions in the radio access network, wherein the node comprises an evolved node B (eNodeB) configured to communicate with user equipment via the radio access network; and in response to receiving the admission requests for accessing the radio access network and in response to determining to apply congestion control based on the admission requests, installing, by the PCRF, subscriber-specific policies on the eNodeB to control congestion in the radio access network, including sending, to the eNodeB, an admission control policy instruction to allow admission requests for accessing the radio access network made only by subscribers of certain tiers and subscriber information from a subscriber profile repository (SPR) for carrying out the admission control policy instruction, causing the eNodeB to:

receive a first admission request for accessing the radio access network and, in response to determining, using the subscriber information from the SPR, that a first subscriber tier for the first admission request is not one of the certain tiers of the admission control policy instruction, deny the first admission request for accessing the radio access network; and receive a second admission request for accessing the radio access network and, in response to determining, using the subscriber information from the SPR, that a second subscriber tier for the second admission request is one of the certain tiers of the admission control policy instruction, allow the second admission request for accessing the radio access network.

7. The method of claim 6 wherein installing subscriber-specific policies comprises installing congestion control policies to manage congestion in the radio access network based on time of day.

8. The method of claim 6 wherein installing subscriber-specific policies comprises installing congestion control policies to manage congestion in the radio access network based on device type.

9. The method of claim 6 wherein installing subscriber-specific policies comprises installing congestion control policies in the radio access network based on network conditions, including congestion.

10. The method of claim 6 wherein installing subscriber-specific policies comprises installing congestion control policies to manage congestion in the radio access network based on quality of service (QoS) requested by an application on a user equipment (UE).

11. A non-transitory computer readable medium having stored thereon executable instructions that when executed by the processor of a computer control the computer to perform steps comprising:

receiving admission requests for accessing the radio access network from a node configured to perform admission control functions in the radio access network, wherein the node comprises an evolved node B (eNodeB) configured to communicate with user equipment via the radio access network; and in response to receiving the admission requests for accessing the radio access network and in response to determining to apply congestion control based on the admission requests, installing, by the PCRF, subscriber-specific policies on the eNodeB to control congestion in the radio access network, including sending, to the eNodeB, an admission control policy instruction to allow admission requests for accessing the radio access network made only by subscribers of certain tiers and subscriber information from a subscriber profile repository (SPR) for carrying out the admission control policy instruction, causing the eNodeB to:

receive a first admission request for accessing the radio access network and, in response to determining, using the subscriber information from the SPR, that a first subscriber tier for the first admission request is not one of the certain tiers of the admission control policy instruction, deny the first admission request for accessing the radio access network; and receive a second admission request for accessing the radio access network and, in response to determining, using the subscriber information from the SPR, that a second subscriber tier for the second admission request is one of the certain tiers of the admission control policy instruction, allow the second admission request for accessing the radio access network.

* * * * *